US009674693B2

(12) United States Patent
Kompella et al.

(10) Patent No.: US 9,674,693 B2
(45) Date of Patent: Jun. 6, 2017

(54) STATE-EFFICIENT NETWORK FUNCTION SUPPORT

(71) Applicants: Vachaspathi Kompella, Cupertino, CA (US); Praveen Muley, Cupertino, CA (US); Vinai Sirkay, Los Altos, CA (US); Stephen Vogelsang, Mountain View, CA (US)

(72) Inventors: Vachaspathi Kompella, Cupertino, CA (US); Praveen Muley, Cupertino, CA (US); Vinai Sirkay, Los Altos, CA (US); Stephen Vogelsang, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/877,449

(22) Filed: Oct. 7, 2015

(65) Prior Publication Data

US 2017/0105116 A1    Apr. 13, 2017

(51) Int. Cl.
*H04W 8/24*    (2009.01)
*H04W 8/20*    (2009.01)

(52) U.S. Cl.
CPC .................... *H04W 8/20* (2013.01)

(58) Field of Classification Search
CPC .. H04N 21/454; H04N 21/812; H04N 21/472; H04W 36/0055; H04W 8/06;
(Continued)

(56) References Cited

U.S. PATENT DOCUMENTS

| 2005/0033860 A1* | 2/2005 | Muhonen | H04W 76/022 709/238 |
| 2006/0210079 A1* | 9/2006 | Kato | H04W 60/00 380/247 |

FOREIGN PATENT DOCUMENTS

| WO | WO 2008/002599 A2 | 1/2008 |
| WO | WO 2011/155057 A1 | 12/2011 |
| WO | WO 2014/110410 A1 | 7/2014 |

OTHER PUBLICATIONS

International Search Report and Written Opinion from corresponding PCT/US2016/055720, dated Dec. 22, 2016, 11 pages.

* cited by examiner

*Primary Examiner* — Phuoc H Doan
(74) *Attorney, Agent, or Firm* — Tong, Rea, Bentley & Kim, LLC

(57) ABSTRACT

This disclosure relates to supporting handling of state information for a stateful network function of a communication network. The network function of the communication network is provided by a network function environment including a set of network function instances configured to provide the network function, a scheduler configured to receive messages of subscribers of the communication network and to distribute the messages to the network function instances for processing by the network functions instances in accordance with the network function, and a state information storage device configured to store state information of the subscribers. The network function instances are configured to temporarily store state information of the subscribers locally at the network function instances while subscribers are associated with the network function instances and to transfer state information of the subscribers to the state information storage device when the subscribers are no longer associated with the network function instances.

19 Claims, 5 Drawing Sheets

(58) Field of Classification Search
CPC ....... H04W 4/12; H04W 84/02; H04W 24/04;
H04W 24/08; H04W 88/14; H04L
65/1006; H04L 41/0677; H04L 41/0896;
H04L 41/509; H04L 41/5087
USPC ........ 455/466, 408, 458; 370/329, 328, 259;
380/247; 707/769
See application file for complete search history.

STATE-EFFICIENT NETWORK FUNCTION SUPPORT

TECHNICAL FIELD

The disclosure relates generally to communication environments and, more specifically but not exclusively, to handling state information for network functions in communication environments.

BACKGROUND

In many communication networks, network functions are provided using physical resources. For example, in traditional Evolved Packet Core (EPC) networks, various EPC network functions are provided by dedicated physical devices configured to provide the EPC network functions (e.g., Serving Gateways (SGWs), Packet Data Network (PDN) Gateways (PGWs), Mobility Management Entities (MMES), Packet Charging and Rules Functions (PCRFs), and the like). In some communication networks, in view of recent improvements in various virtualization technologies, attempts are being made to provide various network functions using virtual resources (e.g., virtual machines (VMs) or other types of virtual resources). For example, in virtualized EPC networks, for each of the EPC network functions to be virtualized, the EPC network function may be provided by a set of VMs that is configured to provide the respective EPC network function.

SUMMARY

Various deficiencies in the prior art may be addressed by embodiments supporting improved handling of state information for a network function of a communication network.

In at least some embodiments, an apparatus includes a processor and a memory that is communicatively connected to the processor. The processor is configured to receive a message intended for a network function of a communication network, wherein the network function is a stateful network function and the message is associated with a subscriber. The processor is configured to determine, based on state information control information associated with storage of state information of the subscriber by a state information storage device configured to store state information for subscribers of the communication network, whether a network function instance configured to provide the network function of the communication network is assigned to the subscriber. The processor is configured to direct the message based on whether a network function instance configured to provide the network function of the communication network is assigned to the subscriber. In at least some embodiments, a corresponding method is configured to perform the functions of the apparatus. In at least some embodiments, a computer-readable storage medium stores instructions which, when executed by the computer, cause the computer to perform a method adapted to perform the functions of the apparatus.

In at least some embodiments, an apparatus includes a processor and a memory that is communicatively connected to the processor. The processor and memory are configured to provide a network function instance. The network function instance is configured to provide a network function of a communication network. The network function is a stateful network function. The network function instance is configured to receive a message intended for the network function of the communication network wherein the message is associated with a subscriber, process the message wherein processing of the message produces state information of the subscriber that is stored in the memory of the network function instance, and transfer the state information of the subscriber from the network function instance to a state information storage device configured to store state information for subscribers of the communication network. In at least some embodiments, a corresponding method is configured to perform the functions of the apparatus. In at least some embodiments, a computer-readable storage medium stores instructions which, when executed by the computer, cause the computer to perform a method adapted to perform the functions of the apparatus.

In at least some embodiments, an apparatus includes a processor and a memory that is communicatively connected to the processor. The processor and memory are configured to provide a network function instance. The network function instance is configured to provide a network function of a communication network. The network function is a stateful network function. The network function instance is configured to receive a message intended for the network function of the communication network wherein the message is associated with a subscriber, obtain state information of the subscriber from a state information storage device configured to store state information for subscribers of the communication network, and process the message based on the state information of the subscriber. In at least some embodiments, a corresponding method is configured to perform the functions of the apparatus. In at least some embodiments, a computer-readable storage medium stores instructions which, when executed by the computer, cause the computer to perform a method adapted to perform the functions of the apparatus.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION

This disclosure generally relates to supporting handling of state information for a stateful network function of a communication network. The stateful network function of the communication network is provided within the context of a network function environment. The network function environment includes a set of network function instances, each of which is configured to provide the network function of the communication network. The network function environment includes a scheduler configured to receive messages from subscribers of the communication network and to distribute the messages from the subscribers of the communication network to the network function instances for processing by the network functions instances in accordance with the network function provided by the network function instances. The network function environment includes a state information storage device configured to store state information of the subscribers of the communication network. The network function instances are configured to temporarily store state information of the subscribers locally at the network function instances while subscribers are associated with the network function instances and to transfer state information of the subscribers to the state information storage device when the subscribers are no longer associated with the network function instances. This prevents a network function instance from becoming permanently assigned to a subscriber (e.g., for the lifetime of the subscriber); rather, the network function instance relinquishes responsibility for the subscriber based on a condition and transfers the state information of the subscriber to the state information storage device without maintaining the state information of the subscriber locally on the network function instance, thereby releasing the network function instance for use in supporting other subscribers and, thus, increasing the utilization level and the efficiency of the network function environment. These and various other embodiments may be further understood by way of reference to the exemplary system of FIG. 1.

Figure 1:
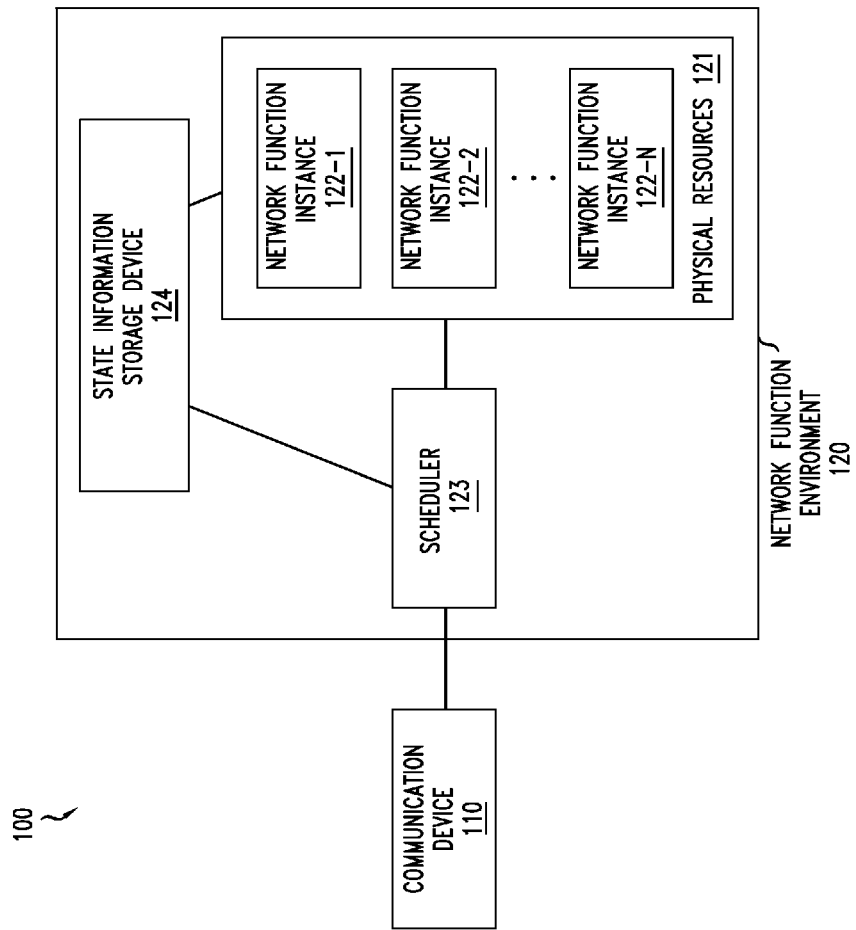
FIG. 1 depicts an exemplary system including a network function environment configured to support improved handling of state information for a network function of a communication network.

FIG. 1 depicts an exemplary system including a network function environment configured to support improved handling of state information for a network function of a communication network.

The system 100 includes a communication device (CD) 110 and a network function environment (NFE) 120.

The CD 110 is a communication device configured to interact with a network function environment, which may vary for different network function environments, different network functions provided by the network function environment, or the like. For example, CD 110 may be an end user device (e.g., a desktop computer, a laptop, a tablet, a smartphone, a set top box (STB), a smart television, or the like). For example, CD 110 may be an end device used in machine-to-machine (M2M) communications or machine type communications (MTCs), such as a sensor, a meter, or the like. For example, CD 110 may be a physical network device (e.g., a wireless access node, a router, a server, a mobility management element, or the like) or a virtualized network device (e.g., a virtual router, a virtual service, a virtual mobility management entity, or the like). More generally, the CD 110 may represent any device which may send a message for processing within the NFE 120 by the network function of NFE 120.

The NFE 120 is an environment configured to support a network function (NF). As discussed further below, the NFE 120 may be a physical environment (e.g., a physical device, a set of physical devices where the physical devices are communicatively connected in some manner, or the like) or a virtualization environment (e.g., a datacenter environment of a cloud provider, a cloud environment of a network service provider, or any other suitable type of virtualization environment).

The NFE 120 includes physical resources (PRs) 121, a set of NF instances (NFIs) 122-1-122-N (collectively, NFIs 122) supported by the PRs 121, a scheduler 123, and a state information storage device (SISD) 124.

The PRs 121 of NFE 120 may include physical resources which may support NFIs 122 in a physical environment or a virtualization environment. For example, PRs 121 may include processing resources (e.g., processors, processor cores, or the like), memory resources (e.g., memory devices, caches, or the like), storage resources (e.g., storage devices), input-output resources, network resources (e.g., network elements, communication links, or the like), or the like, as well as various combinations thereof.

The NFIs 122 of NFE 120 are configured to provide the NF supported by the NFE 120 (e.g., each NFI 122 is configured to provide the NF supported by the NFE 120 independent of other NFIs 122). In an embodiment in which the NFE 120 is a physical environment, the NFIs 122 may include physical instances of the NF (e.g., processor cores on a processor or a set of processors, processors on a physical device or a set of physical devices, or the like, as well as various combinations thereof). In an embodiment in which the NFE 120 is a virtualization environment, the NFIs 122 may include virtual instances of the NF (e.g., virtual machines (VMs) or other suitable virtual devices or elements). In at least some embodiments, the NF may be provided using a combination of physical instances and virtual instances.

The NF that is supported by NFE 120 may be a data plane (or portion of a data plane) of a communication network, a control plane (or portion of a control plane) of a communication network, a service router (SR) function of an SR, a broadband network gateway (BNG) function of a BNG, or the like.

For example, the NF that is supported by NFE 120 may be a data plane or a control plane of a wireless access network (e.g., a Third Generation (3G) wireless access network, a Fourth Generation (4G) wireless access network, a Fifth Generation (5G) wireless access network, or the like).

For example, the NF that is supported by NFE 120 may be a data plane or a control plane of a wireless core network (e.g., a 3G wireless core network, a 4G Long Term Evolution (LTE) Evolved Packet Core (EPC) network, a 5G wireless core network, or the like). For example, the NF that is supported by NFE 120 may be a data plane of an EPC network (e.g., including the Serving Gateway (SGW) functions of an EPC network, the Packet Data Network (PDN) Gateway (PGW) functions of an EPC network, or the like, as well as combinations thereof). For example, the NF that is supported by NFE 120 may be a control plane of an EPC network (e.g., including the Mobility Management Entity (MME) functions of an EPC network, the Packet Charging and Rules Function (PCRF) functions of an EPC network, or the like, as well as combinations thereof). For example, the NF that is supported by NFE 120 may be a data plane or control plane of an Internet Protocol (IP) Multimedia Subsystem (IMS) network. It will be appreciated that the NF that is supported by NFE 120 may include various other data plane functions and/or control plane functions of various other types of communication networks.

For example, the NF that is supported by NFE 120 may be an SR function of an SR of a data communication network. For example, the NF that is supported by NFE 120 may include the full set of functions typically supported by an SR or portions thereof. For example, functions typically supported by an SR may include layer 2/layer 3 routing capabilities, traffic management capabilities, service-aware application processing, hierarchical quality-of-service (QoS) functions, or the like.

For example, the NF that is supported by NFE 120 may be a BNG function of a BNG of a data communication network. For example, the NF that is supported by NFE 120 may include the full set of functions typically supported by a BNG or portions thereof. For example, functions typically supported by a BNG may include establishment of subscriber sessions, authentication, authorization, and accounting (AAA) of subscriber sessions, address assignment, security, traffic aggregation, policy management, QoS functions, or the like.

The NF that is supported by NFE 120 may include various other types of network functions which may be provided within various other types of communication networks.

The NF that is provided by the NFIs 122 of NFE 120 is a stateful network function configured to operate based on state information and, thus, the NFIs 122 of NFE 120 perform the NF of NFE 120 based on state information. The NFIs 122 may be configured to perform functions on a per subscriber basis and, thus, may operate based on per subscriber state information (referred to more generally herein as subscriber state information or state information of a subscriber). In general, the subscribers may be any entities which may utilize the NF of NFE 120 (e.g., end users, devices (e.g., end user device, M2M-type or MTC-type devices, network elements, or the like), or the like). The types of state information used by NFIs 122 may vary for different types of NFs which may be provided within NFE 120, for different types of subscribers utilizing the NF provided within NFE 120, for different types of messages to be processed by the NF provided within NFE 120, or the like. For example, where the NFIs 122 each support an EPC data plane function, the state information of a subscriber may include Tunnel Endpoint (TE) Identifiers (TEIDs), Traffic Flow Templates (TFTs), or the like. For example, where the NFIs 122 each support an EPC control plane function, the state information of a subscriber may include subscriber location information, subscriber connection state information (e.g., idle, active, in the process of handover between cell towers, in the process of disconnecting, disconnected, or the like), or the like. For example, where the NFIs 122 each support an SR function, the state information of a subscriber may include routing information for the subscriber. For example, where the NFIs 122 each support a BNG function, the state information of a subscriber may include QoS information for the subscriber. The state information utilized by NFIs 122 to provide the NF of NFE 120 may include various other types of state information which, as indicated above, may vary based on the type of NF provided by NFE 120, the type(s) of subscriber(s) supported, the type(s) of message(s) to be processed, or the like, as well as various combinations thereof.

The NFIs 122 of NFE 120 are configured to process messages that are received at the NFE 120 for handling by the NF provided by NFIs 122 of NFE 120.

The messages received at the NFE 120 may be messages received from various types of communication devices (e.g., from CD 110, or from any other suitable types of communication devices (which have been omitted from FIG. 1 for purposes of clarity)).

The messages received at the NFE 120 may vary depending on the type of NF provided by the NFIs 122 of NFE 120. For example, where the NFIs 122 each support an EPC data plane function, the messages may be data packets for routing via the SGW and PGW functions provided by the NFIs 122. For example, where the NFIs 122 each support an EPC control plane function, the messages may be control messages specifying transactions to be performed by the EPC control plane functions (e.g., MME, PCRF, or the like) provided by the NFIs 122. For example, where the NFIs 122 each support an SR function, the messages may be data packets or control messages for handling by the SR function. For example, where the NFIs 122 each support a BNG function, the messages may be data packets or control messages for handling by the BNG function. The messages received at NFE 120 may include various other types of messages.

The messages received at the NFE 120 may be associated with subscribers, respectively. This may be due to the fact that, as discussed above, the NF that is provided by the NFIs 122 of NFE 120 is a stateful function that depends on state information associated with subscribers. The subscriber with which a message is associated may be indicated within the message. The subscriber with which a message is associated may be indicated within the message in various ways (e.g., using a subscriber identifier, using a device identifier of the device from which the message is received if the device identifier uniquely identifies the subscriber, or the like), which may vary based on various factors (e.g., the NF type provided by the NFIs 122 of the NFE 120, the subscriber or type of subscriber from which the message is received, the type of message received, or the like, as well as various combinations thereof). For example, where the NFIs 122 each support an EPC function, the subscribers of the messages may be indicated and identified using a subscriber identifier (e.g., an International Mobile Subscriber Identity (IMSI), a Temporary Mobile Subscriber Identity (TMSI), or the like) or any other value suitable for uniquely identifying subscribers within the EPC network. For example, where the NFIs 122 each support an SR function or a BNG function, the subscribers of the messages may be indicated and identified using dynamically assigned IP addresses, subscriber Ethernet Media Access Control (MAC) addresses, or the like. It will be appreciated that the subscriber with which a message is associated may be indicated in various other ways.

The NFIs 122 of NFE 120 are configured to process messages of subscribers, that are received at NFE 120 for handling by the NF provided by NFIs 122 of NFE 120, based on state information of subscribers. The processing of a message of a subscriber based on state information of the subscriber may be based on initial state information of the subscriber, where the initial state information of the subscriber is state information indicating a state for the subscriber prior to processing of the message. The processing of a message of a subscriber based on state information of the subscriber may produce state information of the subscriber (which may be referred to as state information where processing of the message is not based on initial state information or may be referred to as new state information where processing of the message is based on initial state information and processing of the message updates or replaces the initial state information).

The NFE 120 is configured to provide efficient handling of state information for the NF of NFE 120. The NFIs 122, scheduler 123, and SISD 124 may cooperate to provide efficient handling of state information for the NF of NFE 120.

The NFIs 122 receive messages of subscribers from scheduler 123. The NFIs 122, as discussed above, are configured to use state information of the subscribers to process messages of the subscribers that are received from scheduler 123. The NFIs 122, although configured to provide an NF that is stateful, only temporarily store state information of the subscribers (e.g., during a time in which an NFI 122 is responsible for processing messages of a subscriber) rather than permanently storing state information of the subscribers (e.g., for the lifetime of the subscriber). The SISD 124, as discussed further below, is configured to permanently store state information of the subscribers on behalf of the NFIs 122, thereby freeing NFIs 122 from being permanently assigned to handle specific subscribers and, thus, providing scheduler 123 greater flexibility in distributing messages of the subscribers across the NFIs 122. The NFIs 122 are configured to obtain state information of subscribers that is maintained by the SISD 124 (e.g., from the SISD 124, from the scheduler 123 where the scheduler 123 retrieves the state information of the subscriber from the SISD 124 on behalf of the NFI 122, or the like) when the state information of the subscriber is needed by the NFI 122 for processing a message of the subscriber and to transfer state information of the subscriber back to the SISD 124 under various state information transfer conditions (e.g., completion of processing of the message of the subscriber, expiration of a timer that was initiated after completion of processing of the message of the subscriber without receipt of a new message of the subscriber, or the like). The transfer of state information of a subscriber from an NFI 122 to the SISD 124 for storage in the SISD 124, rather than storing the state information of the subscriber in the NFI 122 for the lifetime of the subscriber, frees that NFI 122 from being permanently assigned to handle that subscriber and, thus, enables that NFI 122 to be used to process messages of other subscribers. As a result, the provider of NFE 120 is not required to maintain a dedicated NFI 122 for each subscriber and, thus, can serve the full set of subscribers using a reduced number of NFIs 122 (thereby reducing cost for the provider of NFE 120). The operation of NFIs 122 in supporting efficient handling of state information for the NF of NFE 120 may be further understood by way of reference to the methods of FIG. 2, FIG. 3, and FIG. 4.

The scheduler 123 of NFE 120 is configured to schedule processing of messages by NFIs 122 of NFE 120. The scheduler 123 may be configured to control routing of messages received at NFE 120 to the NFIs 122. The scheduler 123 may be configured to control routing of messages received at NFE 120 to the NFIs 122 based on state information control information. The state information control information may be indicative as to whether a subscriber associated with a received message is assigned to one of the NFIs 122 of NFE 120 (which also may be considered to be indicative as to whether one of the NFIs 122 of NFE 120 is assigned to the subscriber of the received message). The scheduler 123 may be configured to receive a message of a subscriber, determine whether one of the NFIs 122 is currently assigned to the subscriber (e.g., the NFI 122 is currently storing state information of the subscriber, such as where the NFI 122 is currently processing a previous message of the subscriber, the NFI 122 has completed processing of any previous messages of the subscriber but has not yet relinquished control of the subscriber and transferred the state information of the subscriber to the SISD 124, or the like), and directs the message based on the result of the determination as to whether one of the NFIs 122 is currently assigned to the subscriber. The scheduler 123, based on a determination that one of the NFIs 122 is currently assigned to the subscriber (and, thus, currently assigned to process messages of the subscriber), sends the message to the NFI 122 that is currently assigned to the subscriber. The scheduler 123, based on a determination that one of the NFIs 122 is not currently assigned to the subscriber, selects one of the NFIs 122 (an available NFI 122 that is not currently assigned to a subscriber) and sends the message to the selected one of the NFIs 122 for processing by the selected one of the NFIs 122. The operation of scheduler 123 in supporting efficient handling of state information for the NF of NFE 120 may be further understood by way of reference to the methods of FIG. 2, FIG. 3, and FIG. 4. It will be appreciated that scheduler 123 may be configured to provide various other functions as discussed further herein.

The SISD 124 is configured to store state information for subscribers. The SISD 124 is configured to communicate with NFIs 122 for purposes of exchanging state information with the NFIs 122 (e.g., providing state information to NFIs 122 for use in processing messages of subscribers, receiving state information from NFIs 122 for storage on behalf of the NFIs 122, or the like). The SISD 124 may be configured to communicate with scheduler 123 for various purposes related to handling of state information, such as for informing the scheduler 123 regarding the storage of state information of particular subscribers, informing the scheduler 123 of the storage locations of state information of particular subscribers, or the like, as well as various combinations thereof. The SIDS 124 is configured to enable state information of subscribers to be removed from the NFIs 122 (such that the NFIs 122 are not required to permanently store state information of the subscribers for the lifetime of the subscribers), such that scheduler 123 can schedule processing of messages of subscribers by NFIs 122 by viewing available NFIs 122 of NFE 120 (those not currently assigned to subscribers) as a common pool of stateless resources available for selection by the scheduler 123. The transfer of state information of subscribers from NFIs 122 to SISD 124, in at least some embodiments, may be considered to be a form of checkpointing. The SIDS 124 may be configured to be separate (e.g., from the NFIs 122), shared, scalable, distributed, fault-tolerant, or the like, as well as various combinations thereof. The SISD 124 may be a physical device (e.g., where NFIs 122 are physical instances), a virtual device or element such as a VM (e.g., where the NFIs 122 are virtual instances in a virtualization environment), or the like. It is noted that SISD 124 may be implemented as multiple devices or elements (which may include combinations of physical and virtual devices or elements). The SISD 124 may include, or be implemented as, a database or other non-transitory storage device. The SISD 124 may include one or more controllers and one or more associated storage devices (e.g., databases or other non-transitory storage devices) controlled by the one or more controllers. The operation of SISD 124 in supporting efficient handling of state information for the NF of the NFE 120 may be further understood by way of reference to the methods of FIG. 2, FIG. 3, and FIG. 4. It will be appreciated that SISD 124 may be configured to provide various other functions as discussed further herein.

It will be appreciated that NFE 120, including the associated elements of NFE 120, may provide various other functions supporting state-efficient implementation of network functions including state-efficient handling of state information of network functions.

Figure 2:
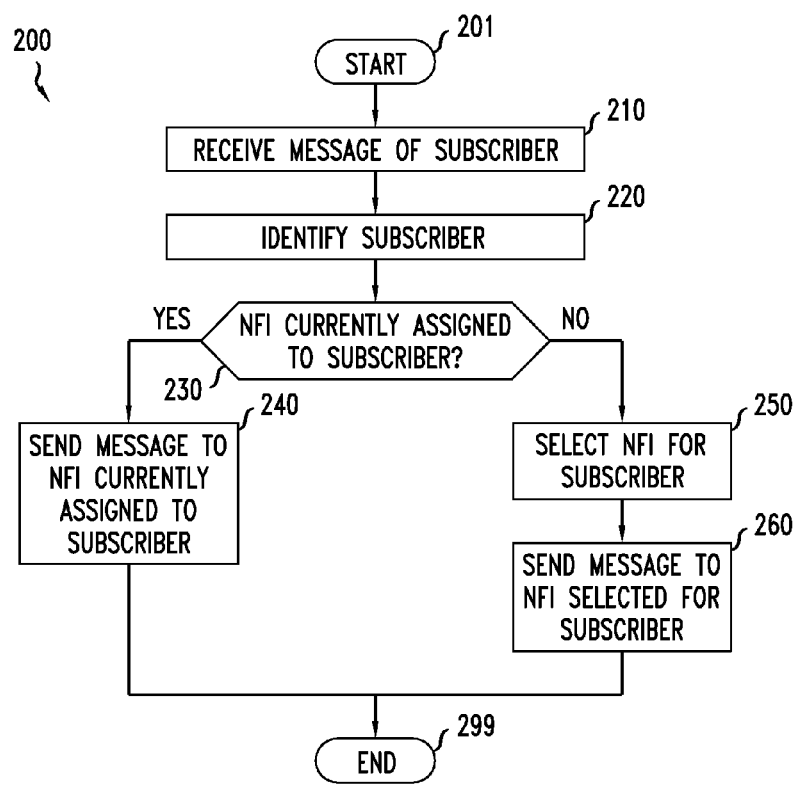
FIG. 2 depicts an exemplary embodiment of a method for use by a scheduler of the network function environment of FIG. 1.

FIG. 2 depicts an exemplary embodiment of a method for use by a scheduler of the network function environment of FIG. 1. The NFE includes the scheduler and a set of NFIs configured to provide an NF of the NFE. The NFE also includes a SISD. It will be appreciated that, although primarily presented as being performed serially, at least a portion of the steps of method 200 may be performed contemporaneously or in a different order than as depicted in FIG. 2.

At step 201, method 200 begins.

At step 210, the scheduler receives a message of a subscriber. The message is intended for the NF of the NFE. The message of the subscriber includes information which may be used to identify the subscriber.

At step 220, the scheduler identifies the subscriber. The subscriber may be identified based on information included within the message of the subscriber (e.g., a subscriber identifier of the subscriber, other information included in the message which may be used to query one or more network elements to identify the subscriber, or the like).

At step 230, the scheduler determines whether an NFI is currently assigned to the subscriber. The determination as to whether an NFI is currently assigned to the subscriber may be based on, or indicative as to whether, state information of the subscriber is (1) currently maintained only on the SISD and not currently stored by any NFI or (2) currently stored in the local memory of an NFI for use by the NFI in providing the network function for the subscriber (e.g., the NFI currently assigned to the subscriber has not yet transferred the state information of the subscriber to the SISD in conjunction with relinquishing responsibility for processing messages of the subscriber).

The determination as to whether an NFI is currently assigned to the subscriber may be performed by the scheduler based on state information control information. The state information control information may include information indicative as to whether state information for the subscriber is (1) currently maintained only on the SISD and not currently stored by any NFI (which is indicative that an NFI is not currently assigned to the subscriber or, stated differently, that the subscriber is not currently assigned to an NFI) or (2) currently stored not only in the SISD, but also in the local memory of an NFI for use by the NFI in providing the network function for the subscriber (which is indicative that an NFI is currently assigned to the subscriber or, stated differently, that the subscriber is currently assigned to an NFI).

The determination as to whether an NFI is currently assigned to the subscriber may be performed by the scheduler based on state information control information maintained by the scheduler (e.g., determined locally by the scheduler based on a subscriber identifier of the subscriber). The state information control information maintained by the scheduler may include subscriber mapping information for each subscriber that is currently assigned to an NFI. For example, for each subscriber that is currently assigned to an NFI, the subscriber mapping information may include a mapping of the subscriber to an indication of the NFI to which the subscriber is currently assigned and, thus, which is currently storing state information of the subscriber locally in a local memory of the NFI such that the state information of the subscriber does not need to be obtained from the SISD in order to process the received message). As discussed further below, the scheduler may remove such a mapping for a subscriber based on receipt of an indication (e.g., from the NFI, from the SISD, or the like) that the state information of the subscriber has been transferred from the NFI to the SISD (and, thus, will need to be retrieved from the SISD by the next NFI assigned to process messages of the subscriber).

The determination as to whether an NFI is currently assigned to the subscriber may be performed by the scheduler based on state information control information maintained by the SISD (e.g., retrieved by the scheduler from the SISD based on a subscriber identifier of the subscriber). The scheduler, after identifying the subscriber of the message, may send to the SIDS a request for information indicating whether the subscriber is currently assigned to an NFI. The SISD may determine whether the subscriber is currently assigned to an NFI based on state information control information maintained by the SISD. For example, based on a determination that the most recent control action for state information of the subscriber was a send action (e.g., state information of the subscriber was transferred from the SISD to an NFI and the SISD has not yet received updated state information of the subscriber from the NFI which would indicate that the NFI transferred state information of the subscriber back to the SISD in conjunction with relinquishing responsibility for the subscriber), the SIDS may determine that the subscriber is currently assigned to a particular NFI. For example, based on a determination that the most recent control action for state information of the subscriber was a storage action (e.g., an NFI that was previously responsible for processing messages of the subscriber transferred state information of the subscriber back to the SISD in conjunction with relinquishing responsibility for the subscriber), the SIDS may determine that the subscriber is not currently assigned to any NFI. The SIDS, after determining whether the subscriber is currently assigned to an NFI based on state information control information maintained by the SISD, responds to the scheduler with an indication as to whether the subscriber is currently assigned to an NFI (e.g., an indication that the subscriber is currently assigned to an NFI (which, optionally, may include an identification of the NFI to which the subscriber is currently assigned) or an indication that the subscriber is not currently assigned to an NFI.

The method 200 proceeds along different paths depending on the result of the determination as to whether an NFI is currently assigned to the subscriber. If a determination is made that an NFI is currently assigned to the subscriber, method 200 proceeds to step 240. If a determination is made that an NFI is not currently assigned to the subscriber, method 200 proceeds to step 250.

At step 240, the scheduler sends the message to the NFI that is currently assigned to the subscriber. It is noted that, since the NFI is currently assigned to the subscriber, the NFI is storing state information of the subscriber such that the NFI does not need to retrieve state information of the subscriber from the SISD.

At step 250, the scheduler selects an NFI to process the message of the subscriber. The selected NFI may be selected from a set of available NFIs of the NFE, where the set of available NFIs may include any NFIs not currently assigned to subscribers. The selected NFI may be selected based on any suitable selection mechanisms or information (e.g., a round robin based selection, a load balancing based selection, based on loading information of the NFIs, or the like, as well as various combinations thereof).

At step 260, the scheduler sends the message of the subscriber to the selected NFI for processing by the selected NFI.

It will be appreciated that, in order to process the message, the selected NFI may need access to state information of the subscriber that is maintained by the SISD. In at least some embodiments, although omitted from FIG. 2 for purposes of clarity, the scheduler may provide additional functions resulting in delivery of the state information of the subscriber to the NFI for use in processing the message.

In at least some embodiments, in addition to providing the message of the subscriber to the selected NFI, the scheduler also may provide to the selected NFI an indication as to whether state information of the subscriber is available from the SISD (e.g., state information may not be available where the received message is the first message ever received for the subscriber, or may be available where the received message is not the first message ever received for the subscriber). In the case in which state information is not available for the subscriber, this may prevent the selected NFI from attempting to obtain state information of the subscriber from the SISD (thereby conserving time and resources). In the case in which state information is available for the subscriber, the scheduler also may provide information to facilitate retrieval of the state information of the subscriber, from the SISD, by the selected NFI (e.g., an indication of a storage location of the state information of the subscriber within the SISD, which may be obtained by the scheduler based on information stored by the scheduler or based on a query to the SISD).

In at least some embodiments, in addition to providing the message of the subscriber to the selected NFI, the scheduler also may send to the SISD an instruction for the SISD to provide the state information of the subscriber to the selected NFI. The instruction may identify the subscriber (for use by the SISD in retrieving the state information of the subscriber) and the selected NFI (for use by the SISD in sending the state information of the subscriber to the selected NFI). This may enable delivery of the state information of the subscriber to the selected NFI to be performed in parallel with delivery of the message from the scheduler to the selected NFI, potentially reducing the response time for processing of the message by the selected NFI.

In at least some embodiments, in addition to providing the message of the subscriber to the selected NFI, the scheduler also may provide the state information of the subscriber to the selected NFI. The scheduler may retrieve the state information of the subscriber from the SISD on behalf of the selected NFI and provide the state information of the subscriber to the selected NFI.

It will be appreciated that these additional functions may be provided within the context of method 200 of FIG. 2 or may be provided using one or more additional methods, or the like, as well as various combinations thereof.

At step 299, method 200 ends.

Figure 3:
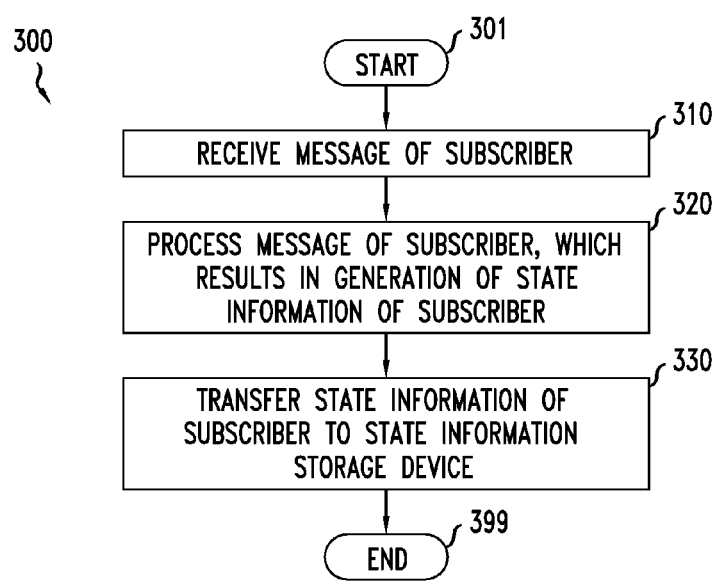
FIG. 3 depicts an exemplary embodiment of a method for use by a network function instance of the network function environment of FIG. 1.

FIG. 3 depicts an exemplary embodiment of a method for use by a network function instance (NFI) of the network function environment of FIG. 1. The NFI is an NFI configured to transfer state information of a subscriber to the SISD after processing a message of the subscriber. It will be appreciated that, although primarily presented as being performed serially, at least a portion of the steps of method 300 may be performed contemporaneously or in a different order than as depicted in FIG. 3.

At step 301, method 300 begins.

At step 310, the NFI receives a message of the subscriber. The NFI receives the message of the subscriber from a scheduler of the NFE. The NFI may have already been assigned to the subscriber prior to receipt of the message by the scheduler (e.g., in which case the NFI already has the state information of the subscriber and, thus, does not need to retrieve the state information of the subscriber from the SISD) or may have been selected by the scheduler upon receipt of the message by the scheduler (in which case the NFI may obtain the state information of the subscriber from the SISD prior to processing the message based on a determination that state information of the subscriber is available in the SISD).

At step 320, the NFI processes the message of the subscriber, which results in generation of state information of the subscriber. The NFI may process the message without using existing state information of the subscriber (e.g., where the message is the first message received by the NFE for the subscriber and, thus, there is no existing state information for the subscriber available within the NFE) or based on existing state information of the subscriber (e.g., where the message is not the first message received by the NFE for the subscriber and, thus, existing state information of the subscriber is available within the NFE). In either case, processing of the message by the NFI produces state information for the subscriber. The state information that is produced based on processing of the message by the NFI may be new state information for the subscriber (e.g., where there was no state information for the subscriber within the NFE prior to processing of the message or where there was state information for the subscriber within the NFE prior to processing of the message but processing of the message produced state information not previously produced for the subscriber), modified state information for the subscriber (e.g., where existing state information of the subscriber that was maintained within the NFE for the subscriber prior to processing of the message is modified based on processing of the message), or the like, as well as various combinations thereof.

At step 330, the NFI transfers the state information of the subscriber to the SISD based on detection of a state information transfer condition.

The transfer of the state information of the subscriber may include sending the state information of the subscriber to the SISD without retaining the state information of the subscriber at the NFI (e.g., deleting the state information of the subscriber from the NFI after the state information of the subscriber is stored on the SISD, marking the state information of the subscriber for deletion at the NFI after the state information of the subscriber is stored on the SISD, or the like). It is noted that removal of the state information of the subscriber from the NFI prevents the NFI from being permanently dedicated to handling of messages of that subscriber for the lifetime of the subscriber, thereby freeing that NFI for use in processing messages of other subscribers and, thus, increasing the utilization level and efficiency of the NFE.

The state information transfer condition may include any condition suitable for use in controlling transfer of state information of the subscriber from the NFI to the SISD. For example, the state information transfer condition may be a determination that processing of the message by the NFI is complete (e.g., the NFI may immediately transfer the state information of the subscriber to the SISD following completion of processing of the message). The state information transfer condition may include any condition suitable for use in controlling transfer of state information of the subscriber from the NFI to the SISD. For example, the state information transfer condition may be a determination that a timer, started following processing of the message by the NFI, has expired without receipt of another message of the subscriber (e.g., the NFI is configured to wait a threshold length of time before giving up responsibility for the subscriber). It is noted that use of a timer in this manner reduces the potential for a ping-pong effect for a subscriber (which has associated costs of transferring the state information of the subscriber to the SISD and retrieving the state information of the subscriber from the SISD), in which responsibility for the subscriber is transferred between NFIs even when messages of the subscriber are received relatively frequently.

At step 399, method 300 ends.

Figure 4:
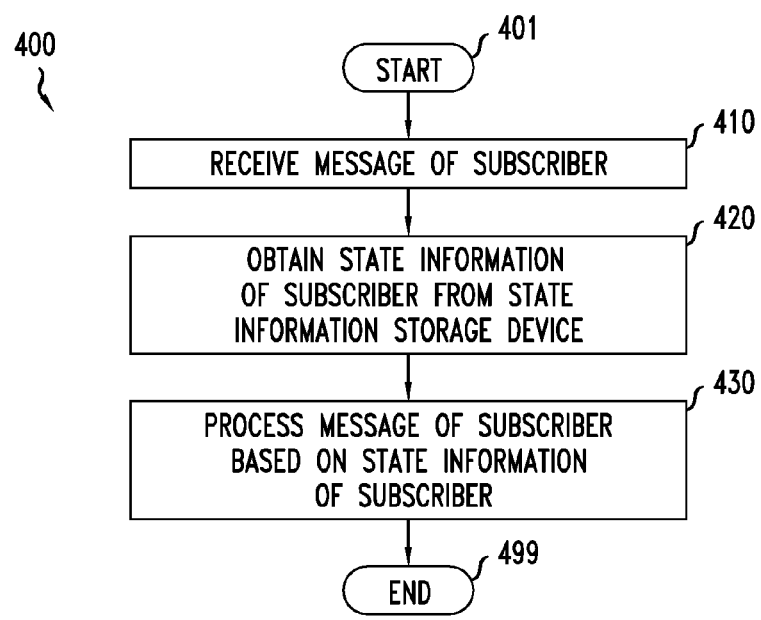
FIG. 4 depicts an exemplary embodiment of a method for use by a network function instance of the network function environment of FIG. 1.

FIG. 4 depicts an exemplary embodiment of a method for use by a network function instance (NFI) of the network function environment of FIG. 1. The NFI is an NFI configured to obtain state information of a subscriber from the SISD before processing a message of the subscriber. It will be appreciated that, although primarily presented as being performed serially, at least a portion of the steps of method 400 may be performed contemporaneously or in a different order than as depicted in FIG. 4.

At step 401, method 400 begins.

At step 410, the NFI receives a message of the subscriber. The NFI receives the message of the subscriber from a scheduler of the NFE. The NFI was not previously assigned to the subscriber prior to receipt of the message by the scheduler, but, rather, was selected by the scheduler upon receipt of the message by the scheduler. As a result, the NFI does not have state information of the subscriber when the message of the subscriber is received.

At step 420, the NFI obtains state information of the subscriber. The NFI obtains the state information of the subscriber from the SISD. The NFI may obtain the state information of the subscriber from the SISD based on a determination by the NFI that the state information of the subscriber needs to be obtained from the SISD (e.g., based on a determination by the NFI that state information of the subscriber is not currently available at the NFI, based on an indication from the scheduler that the NFI needs to obtain the state information of the subscriber from the SISD, or the like). The NFI may obtain the state information of the subscriber from the SISD based on subscriber identification information associated with the subscriber (e.g., included within the message, provided by the scheduler, or the like). The NFI may obtain the state information of the subscriber from the SISD based on a storage location of the state information of the subscriber within the SISD (e.g., which may be provided to the NFI by the scheduler).

At step 430, the NFI processes the message of the subscriber based on the state information of the subscriber. The processing of the message of the subscriber based on the state information of the subscriber results in generation of state information of the subscriber. The state information that is generated based on processing of the message by the NFI may be new state information for the subscriber (e.g., where there was state information for the subscriber within the NFE prior to processing of the message but processing of the message produced state information not previously produced for the subscriber), modified state information for the subscriber (e.g., where the existing state information of the subscriber, that was maintained within the NFE for the subscriber prior to processing of the message and obtained by the NFI for processing of the message, is modified based on processing of the message), or the like, as well as various combinations thereof.

It will be appreciated that, although omitted from FIG. 4 for purposes of clarity, the NFI may continue to operate as depicted and described with respect to method 300 of FIG. 3 (e.g., receiving and processing new messages of the subscriber, transferring state information of the subscriber to the SISD based on detection of a state information transfer condition, or the like, as well as various combinations thereof).

At step 499, method 400 ends.

Figure 5:
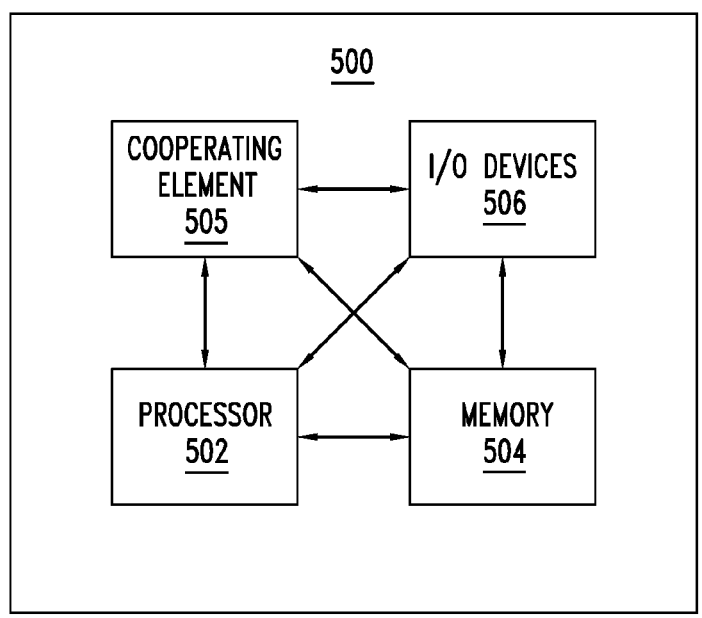
FIG. 5 depicts a high-level block diagram of a computer suitable for use in performing functions described herein.

FIG. 5 depicts a high-level block diagram of a computer suitable for use in performing functions described herein.

The computer 500 includes a processor 502 (e.g., a central processing unit (CPU), a processor having a set of processor cores, a processor core of a processor, or the like) and a memory 504 (e.g., a random access memory (RAM), a read only memory (ROM), or the like) that is communicatively connected to the processor 502.

The computer 500 also may include a cooperating element 505. The cooperating element 505 may be a process that can be loaded into the memory 504 and executed by the processor 502 to implement functions as discussed herein (in which case, for example, the cooperating element 505 (including associated data structures) can be stored on a computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing one or more of CD 110, PRs 121 or portions of PRs 121, one or more NFIs 122 or a portion of an NFI 122, scheduler 123 or a portion of scheduler 123, SISD 124 or a portion of SISD 124, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive, by a device configured to control distribution of messages to a set of network function instances configured to provide a network function of a communication network, a message intended for the network function of the communication network, wherein the network function comprises a stateful network function, wherein the message is associated with a subscriber;
determine, by the device based on state information control information associated with storage of state information of the subscriber by a state information storage device configured to store state information for subscribers of the communication network, whether a network function instance configured to provide the network function of the communication network is assigned to the subscriber; and
direct the message based on whether a network function instance configured to provide the network function of the communication network is assigned to the subscriber.

2. The apparatus of claim 1, wherein the state information control information is available at the apparatus, wherein, to determine whether a network function instance configured to provide the network function of the communication network is assigned to the subscriber, the processor is configured to:
determine whether the state information control information includes a mapping of the subscriber to a network function instance configured to provide the network function of the communication network.

3. The apparatus of claim 1, wherein the state information control information is available at the state information storage device, wherein, to determine whether a network function instance configured to provide the network function of the communication network is assigned to the subscriber, the processor is configured to:
send, toward the state information storage device, a request for an indication as to whether a network function instance configured to provide the network function of the communication network is assigned to the subscriber; and
receive, from the state information storage device, the indication as to whether a network function instance configured to provide the network function of the communication network is assigned to the subscriber.

4. The apparatus of claim 1, wherein the processor is configured to:
send the message to one of the network function instances configured to provide the network function of the communication network based on a determination that the one of the network function instances is assigned to the subscriber.

5. The apparatus of claim 4, wherein the processor is configured to:
receive, from the one of the network function instances or the state information storage device, an indication that the one of the network function instances has transferred the state information of the subscriber to the state information storage device.

6. The apparatus of claim 5, wherein the indication comprises an indication of a storage location within the state information storage device at which the state information of the subscriber was stored.

7. The apparatus of claim 5, wherein the state information control information is available at the apparatus, wherein the processor is configured to:
update the state information control information based on the indication that the one of the network function instances has transferred the state information of the subscriber to the state information storage device.

8. The apparatus of claim 1, wherein the processor is configured to:
select, from the set of network function instances based on a determination that a network function instance configured to provide the network function of the communication network is not assigned to the subscriber, a selected network function instance configured to provide the network function of the communication network; and
send the message toward the selected network function instance configured to provide the network function of the communication network.

9. The apparatus of claim 8, wherein the processor is configured to:
propagate, toward the selected network function instance, an indication that state information of the subscriber is available in the state information storage device.

10. The apparatus of claim 9, wherein the indication that the state information of the subscriber is available in the state information storage device comprises a storage location of the state information of the subscriber within the state information storage device.

11. The apparatus of claim 10, wherein the processor is configured to:
determine the storage location of the state information of the subscriber within the state information storage device based on a subscriber identifier of the subscriber.

12. The apparatus of claim 8, wherein the processor is configured to:
propagate, toward the state information storage device, an instruction for the state information storage device to provide state information of the subscriber to the selected network function instance.

13. The apparatus of claim 8, wherein the processor is configured to:
retrieve state information of the subscriber from the state information storage device; and
propagate the state information of the subscriber toward the selected network function instance.

14. The apparatus of claim 8, wherein the processor is configured to:
receive, from the selected network function instance, an indication that the selected network function instance has transferred the state information of the subscriber to the state information storage device.

15. The apparatus of claim 14, wherein the indication comprises an indication of a storage location within the state information storage device at which the state information of the subscriber was stored.

16. The apparatus of claim 14, wherein the state information control information is available at the apparatus, wherein the processor is configured to:
update the state information control information based on the indication that the selected network function instance has transferred the state information of the subscriber to the state information storage device.

17. The apparatus of claim 1, wherein the network function comprises at least one of a data plane function of the communication network, a control plane function of the communication network, a service router (SR) function, a broadband network gateway (BNG) function, or an Evolved Packet Core (EPC) function.

18. An apparatus, comprising:
a processor and a memory communicatively connected to the processor, the processor and the memory configured to provide a network function instance, the network function instance configured to provide a network function of a communication network, the network function being a stateful network function, the network function instance configured to:
receive, from a device configured to control distribution of messages of subscribers for the network function of the communication network, a message intended for the network function of the communication network, wherein the message is associated with a subscriber;
receive, from at least one of the device configured to control distribution of messages of subscribers for the network function of the communication network or a state information storage device configured to store state information for subscribers of the communication network, initial state information of the subscriber;
process the message based on the initial state information of the subscriber, wherein processing of the message based on the initial state information of the subscriber produces state information of the subscriber that is stored in the memory of the network function instance; and
transfer the state information of the subscriber from the network function instance to the state information storage device configured to store state information for subscribers of the communication network.

19. An apparatus, comprising:
a processor and a memory communicatively connected to the processor, the processor and the memory configured to provide a network function instance, the network function instance configured to provide a network function of a communication network, the network function being a stateful network function, the network function instance configured to:
receive, from a device configured to control distribution of messages of subscribers to the network function of the communication network, a message intended for the network function of the communication network, wherein the message is associated with a subscriber;
receive, from the device configured to control distribution of messages of subscribers to the network function of the communication network, an indication that state information of the subscriber is stored on a state information storage device configured to store state information for subscribers of the communication network;
obtain the state information of the subscriber from the state information storage device configured to store state information for subscribers of the communication network; and
process the message based on the state information of the subscriber.

* * * * *